US009007747B2

(12) United States Patent
Gandhi

(10) Patent No.: US 9,007,747 B2
(45) Date of Patent: Apr. 14, 2015

(54) SLIDER CASE FOR PORTABLE ELECTRONIC DEVICE

(75) Inventor: Harsh Gandhi, Carol Stream, IL (US)

(73) Assignee: Fellowes, Inc., Itasca, IL (US)

(*) Notice: Subject to any disclaimer, the term of this patent is extended or adjusted under 35 U.S.C. 154(b) by 1375 days.

(21) Appl. No.: 12/474,841

(22) Filed: May 29, 2009

(65) Prior Publication Data

US 2010/0302716 A1    Dec. 2, 2010

(51) Int. Cl.
| | |
|---|---|
| H05K 7/00 | (2006.01) |
| H05K 5/00 | (2006.01) |
| A47G 1/10 | (2006.01) |
| A47B 96/06 | (2006.01) |
| G06F 1/16 | (2006.01) |
| H04M 1/02 | (2006.01) |
| H04M 1/18 | (2006.01) |

(52) U.S. Cl.
CPC ...... *G06F 1/1624* (2013.01); *G06F 2200/1633* (2013.01); *H04M 1/0235* (2013.01); *H04M 1/185* (2013.01)

(58) Field of Classification Search
USPC .............................. 361/679.01–679.09, 825, 361/679.1–679.19, 679.21–679.29, 361/679.31–679.45, 679.55–679.6, 361/724–747; 248/917–924, 80–88, 248/155.1–155.5, 166–173, 180.1–186.2, 248/229.1–231.51, 271.4, 292.14, 248/316.1–316.8; 369/75.1, 75.2, 75.11, 369/75.21, 76, 77.11, 77.21, 78, 79, 80, 81, 369/82
See application file for complete search history.

(56) References Cited

U.S. PATENT DOCUMENTS

| | | | | |
|---|---|---|---|---|
| 5,319,519 | A * | 6/1994 | Sheppard et al. | 361/679.39 |
| 6,594,472 | B1 * | 7/2003 | Curtis et al. | 455/575.8 |
| 8,032,193 | B2 * | 10/2011 | Xin et al. | 455/575.4 |
| 2004/0204209 | A1 * | 10/2004 | Bosch | 455/575.2 |
| 2005/0221873 | A1 * | 10/2005 | Kameyama et al. | 455/575.4 |
| 2009/0080153 | A1 * | 3/2009 | Richardson et al. | 361/679.56 |
| 2009/0279234 | A1 * | 11/2009 | Lee | 361/679.01 |

FOREIGN PATENT DOCUMENTS

| | | |
|---|---|---|
| CN | 2728117 Y | 9/2005 |
| CN | 2755874 Y | 2/2006 |
| CN | 2907106 Y | 5/2007 |
| CN | 2010-22207 Y | 2/2008 |
| CN | 201022207 Y | 2/2008 |

OTHER PUBLICATIONS

Office Action dated Jan. 16, 2014 in corresponding Chinese Patent Application No. 200910165010.X.
Notification of the First Office Action, Chinese Patent Appln. No. 200910165010.X, Jan. 16, 2014.

* cited by examiner

*Primary Examiner* — Jayprakash N Gandhi
*Assistant Examiner* — Jerry Wu
(74) *Attorney, Agent, or Firm* — Wood, Phillips, Katz, Clark & Mortimer

(57) ABSTRACT

A case for a portable electronic device, the portable electronic device having a first portion that slides away from a second portion. The case includes a first portion and a second portion that fit over the respective portions of the portable electronic device. The two portions of the case are coupled together in a sliding relationship so that the case portions slide along with the respective portions of the portable electronic device. The case portions are coupled to each other by interfacing structures such as rails and channels.

18 Claims, 5 Drawing Sheets

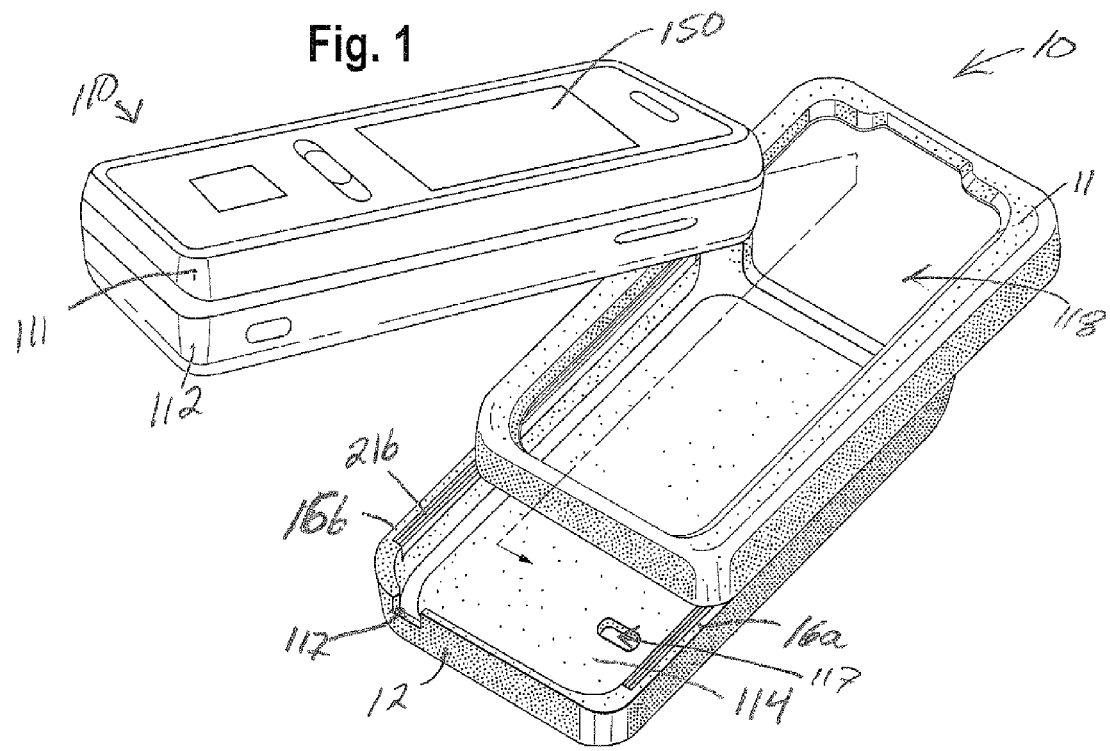
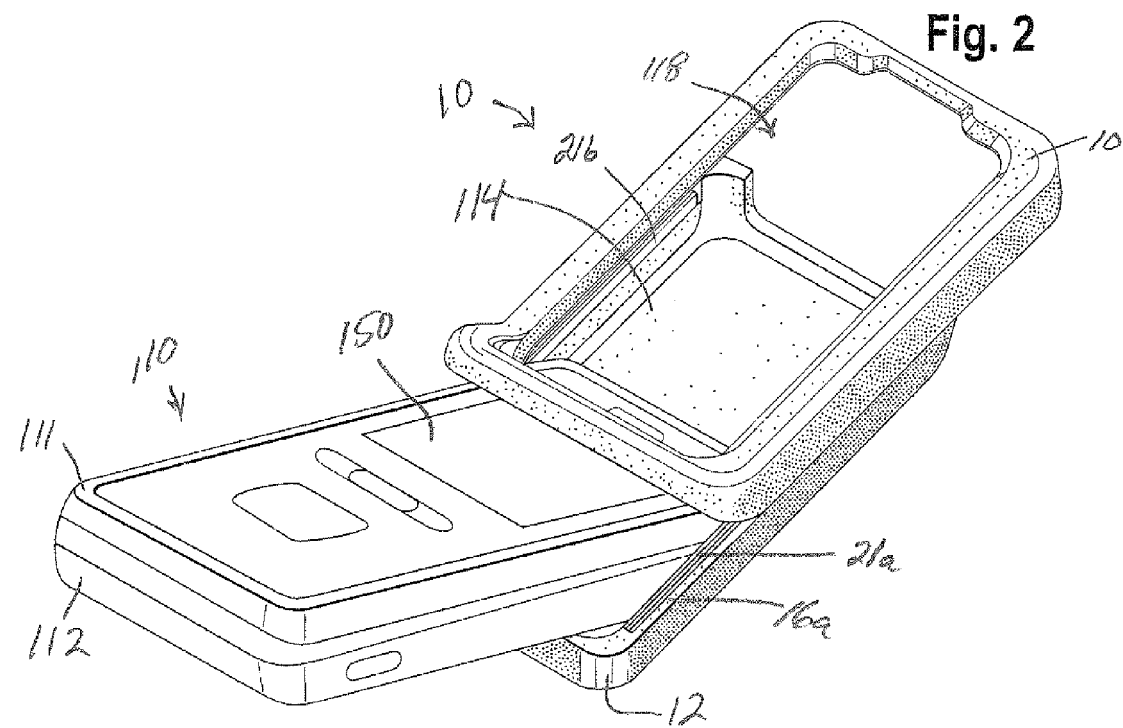

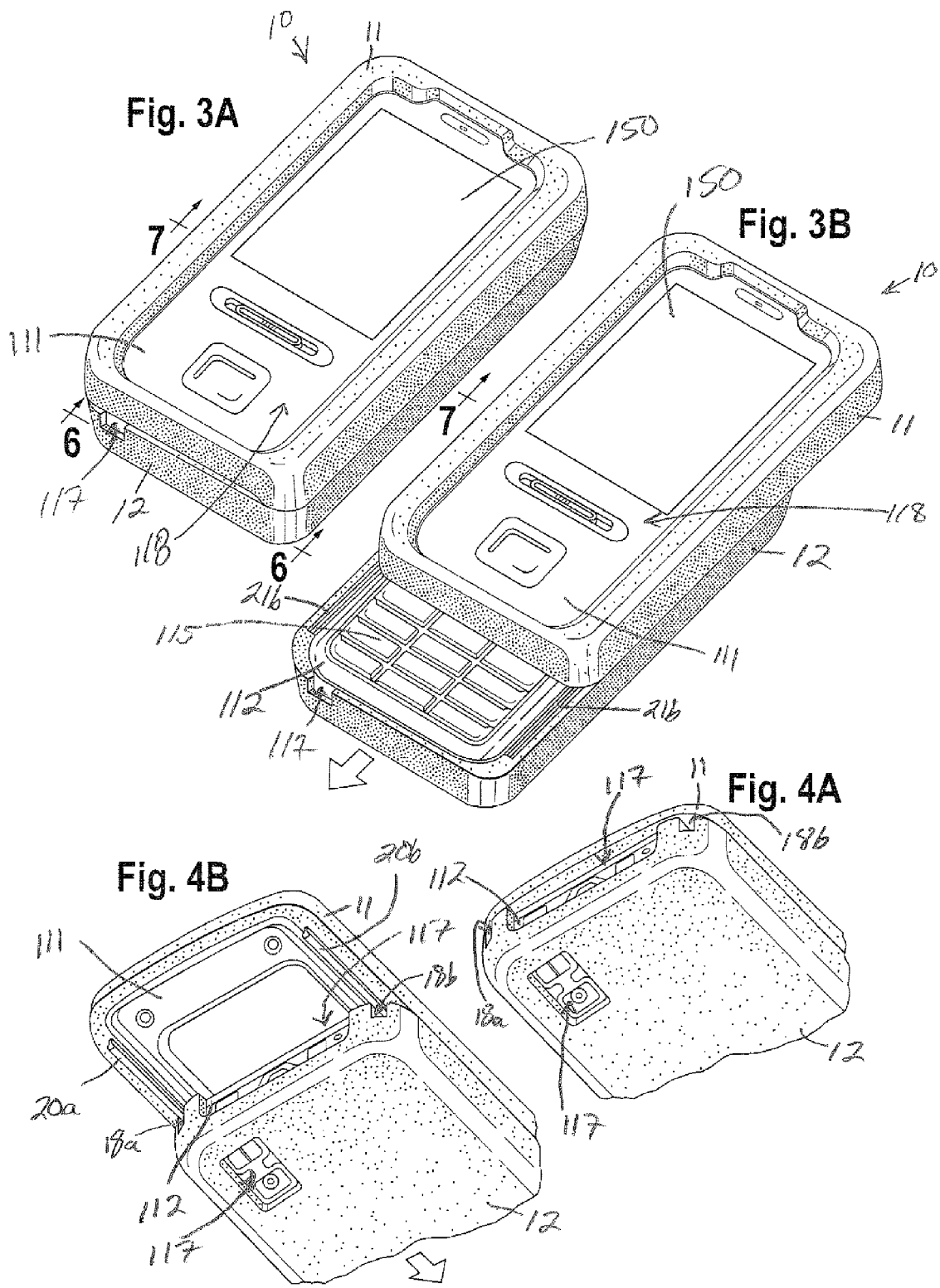

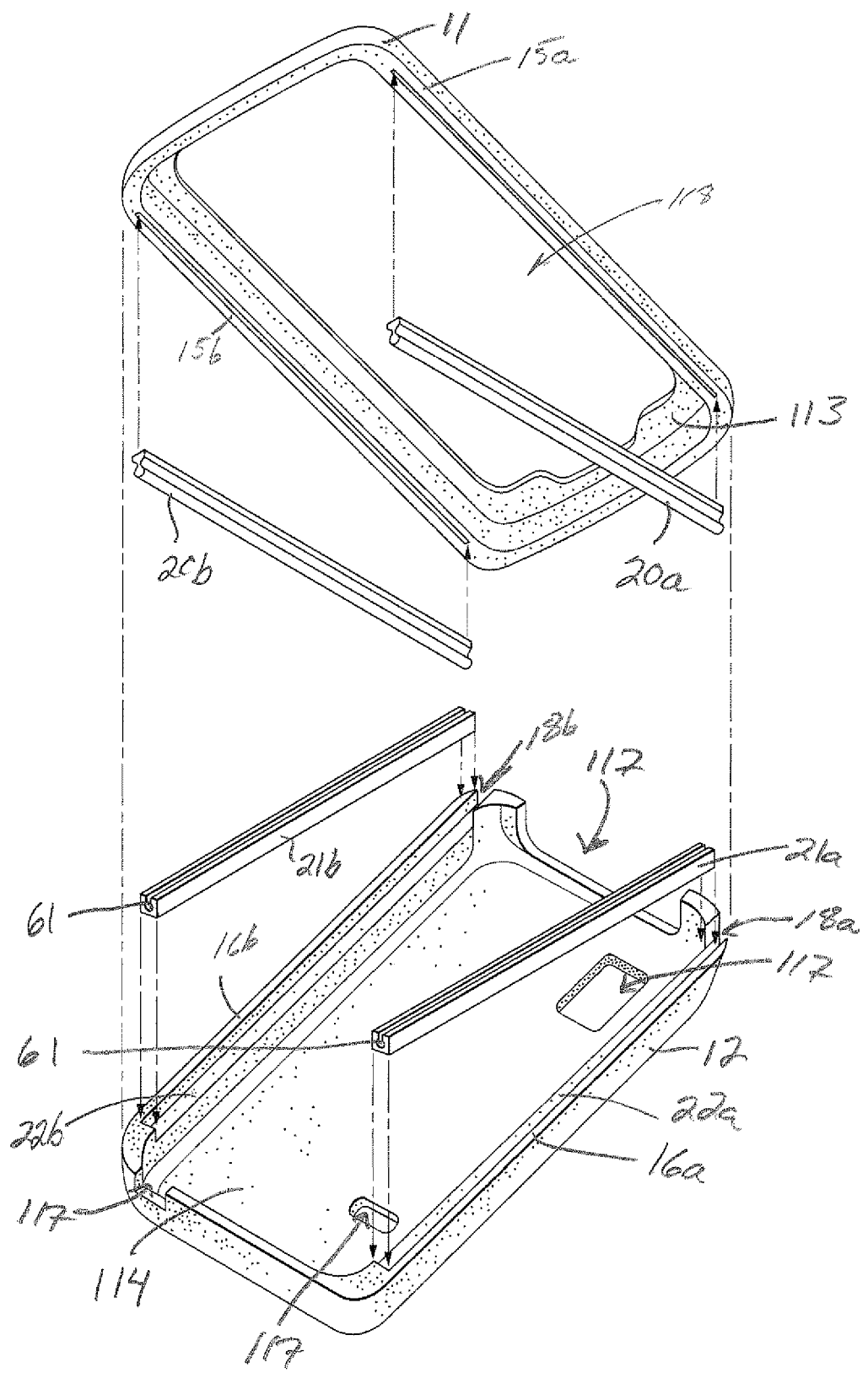

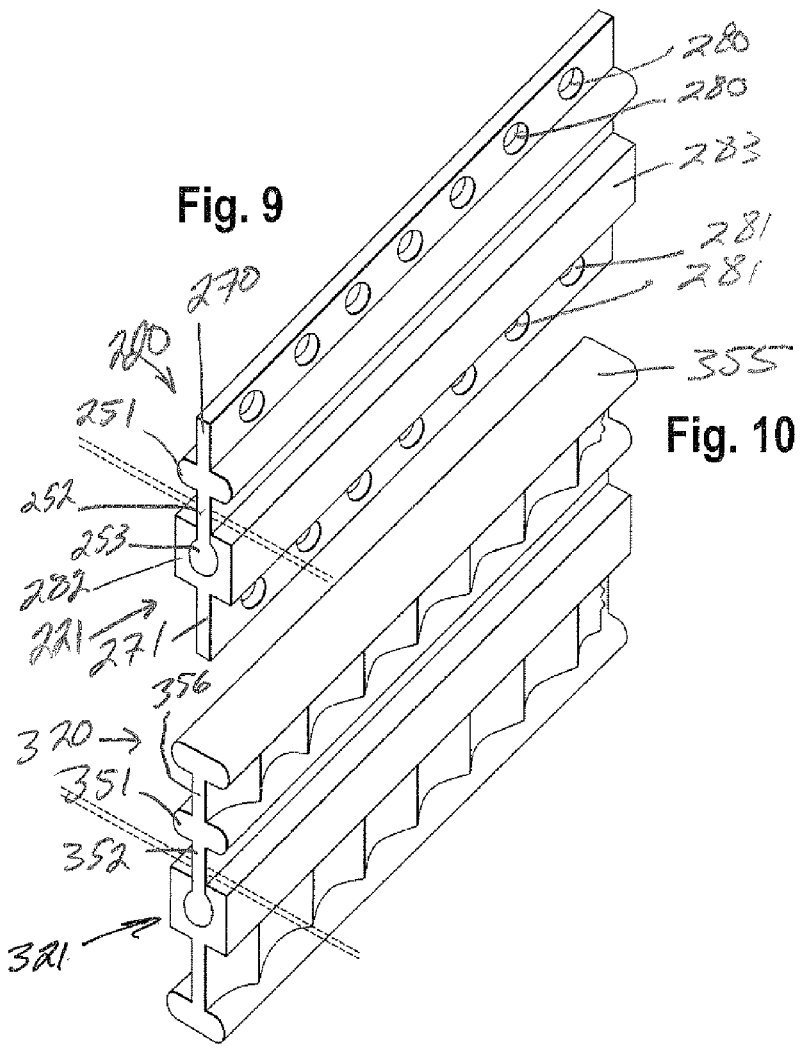
Fig. 9
Fig. 10
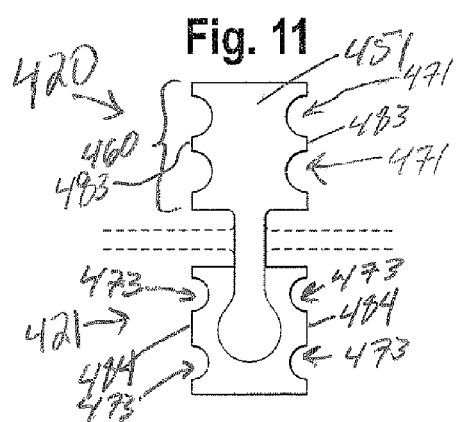
Fig. 11

SLIDER CASE FOR PORTABLE ELECTRONIC DEVICE

FIELD OF THE INVENTION

The invention relates to cases for protecting and carrying portable electronic devices.

BACKGROUND OF THE INVENTION

Users of portable electronic devices, such as cell phones, recorders, instruments, MP3 players, PDA's, and computers, often desire to provide the devices with a removable case to cover portions of the device. The case provides added protection to the device to prevent surface damage to the housing or enclosure of the device, as well as providing impact protection. The cases can also include a clip or an attachment post for a clip, to allow the user to secure the case and phone to an object, such as a belt. The case may also give the user a more secure grip or improved tactile experience when compare to the housing or enclosure of the device. The case may also provide ornamentation to the device and carry indicia, advertising, or graphic material.

The cases can be made of many different types of material, such as hard or soft plastics, rubber, leather, cloth, metal, and silicone. Cases of the prior art include two piece cases that snap together to encase the device, two piece cases that snap onto different portions of the device, as well as single piece cases that form a pouch or pocket into which the device is inserted. The single piece prior art designs work well for devices that have a fixed outer geometry or dimension, such as a "candy bar" cellular phone. The single piece prior art cases do not work for devices that have a variable outer geometry, such as the slider cell phones that have recently become popular.

The slider cell phone includes two housing portions that are slidably connected to one another. In a first configuration, the housing is in its most compact dimension, and generally looks like a "candy bar" style phone. In a second configuration less compact than the first, a first portion of the housing slides along the second portion of the housing to reveal additional controls or displays. Typically the first portion of the housing containing the display and limited controls, slides to revel a keyboard on the second portion of the housing. The sliding of the first portion allows the keyboard to be selectively covered or exposed. Because the sliding relationship changes the outer dimensions of the phone, the cases of the prior art do not readily adapt to this new style of phone.

Although there are existing two piece cases that include portions that snap onto each portion of the device housing, such cases are not optimal. The close tolerances between the sliding portions of the enclosure do not always allow for an edge or other attachment area for securing the case on the two portions of the enclosure. Additionally, snap on cases, or faceplates, are easily dislodged when the user acts to slide the sliding portion of the phone. If the material for the case in non-rigid, such as silicone, leather, or other flexible sheet materials, edges of the enclosure will not provide a sufficient attachment area, even if the tolerances between the housing portions are wide. For soft cases, it is preferable that the case wrap around both portions of the housing of the device to better secure the soft case to the device.

SUMMARY OF THE INVENTION

The present invention is a case for a portable electronic device, the case including a first portion that is slidably connected to a second portion. The case can be made of any material that is typically used for portable electronic devices cases, such as leather, plastic, metal, and other thin sheet materials. In the preferred embodiment, the case is made of silicone.

The first portion of the case is shaped to conform to the outside of a first portion of the housing of the electronic device. The first portion includes rails formed as part of, attached to, or embedded in the perimeter of the case so that they face and engage channels formed as part of, attached to, or embedded in the perimeter of the second portion of the case, which is fitted to the second portion of the electronic device housing. Since the rails and channels engage each other, the two portions of the case become linked, coupled, or attached to one another and so engaged, coupled, or attached, form a case about the device. In such a fashion, the device housing is cradled, contained, held, or secured between the two connected portions of the case. The first and second portions of the case slide with the first and second portions of the device housing when the device housing portions are slid apart by the user.

BRIEF DESCRIPTION OF THE DRAWINGS

FIG. 1 is a perspective view of a portable electronic device and the partially open case of the present application.

FIG. 2 is a perspective view of a portable electronic device being inserted into the partially open case.

FIG. 3A is a perspective view of the portable electronic device in the case.

FIG. 3B is a perspective view of the portable electronic device in a displaced configuration to reveal a user interface.

FIG. 4A is a perspective view of the underside of the portable electronic device in the case in a displaced configuration.

FIG. 4B is a perspective view of the underside of the portable electronic device in the case.

FIG. 5 is an exploded view of the components of the case.

FIG. 9 is a perspective view of an alternate embodiment of the channels and rails.

FIG. 10 is a perspective view of an alternate embodiment of the channels and rails.

FIG. 11 is an elevational view of an alternate embodiment of the channels and rails.

DESCRIPTION OF THE PREFERRED EMBODIMENT

Figure 6:
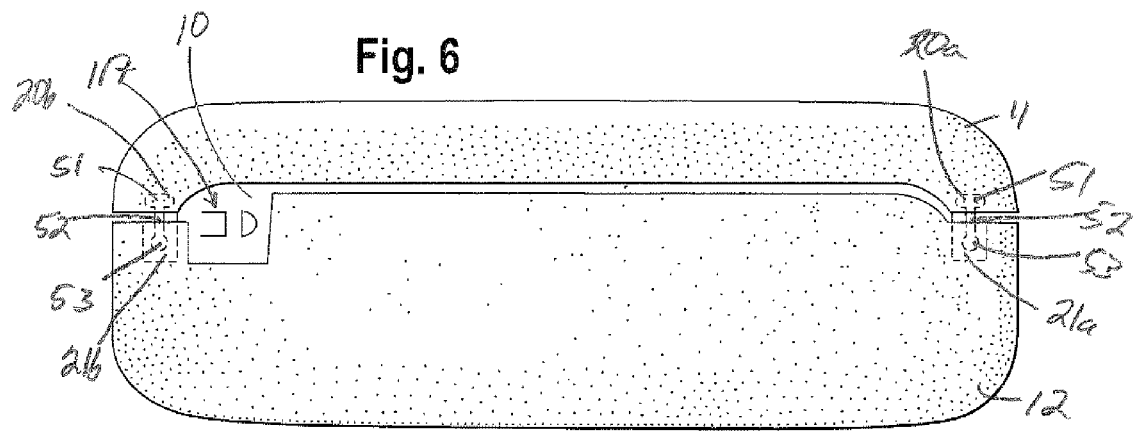
FIG. 6 is an end view of the bottom end of the portable electronic device in the case.
Figure 7:
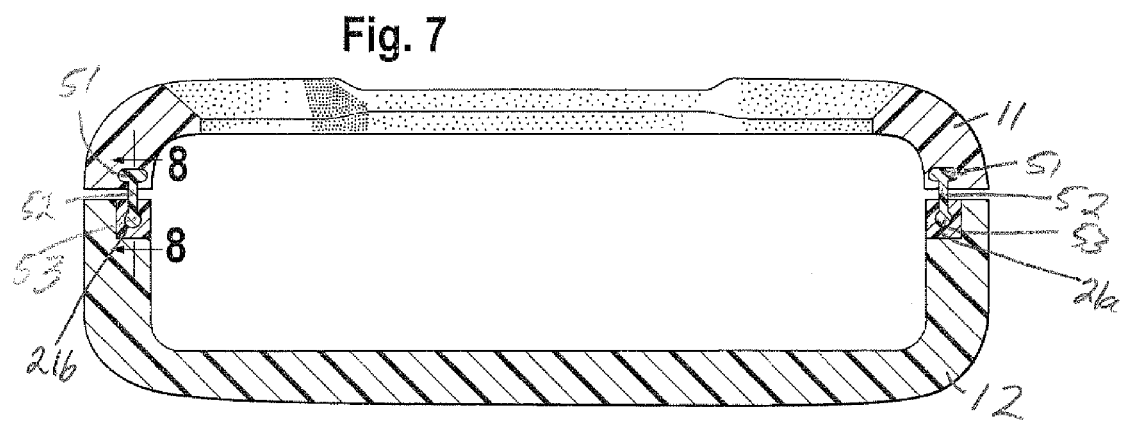
FIG. 7 is a cross-sectional view of the case without the portable electronic device.
Figure 8:
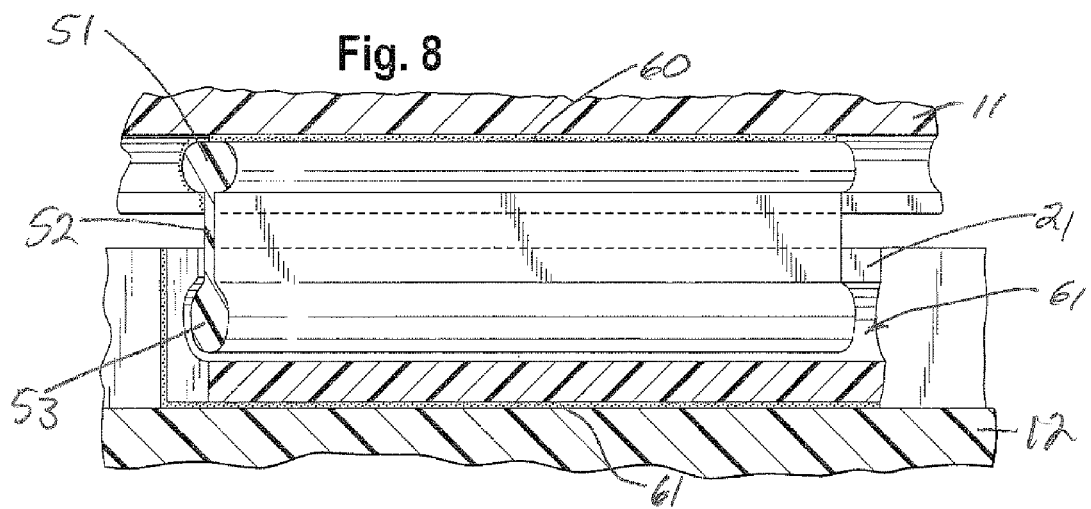
FIG. 8 is an exposed cross-sectional view of the rail and channel of the case.

With reference to the figures, the invention described herein is a case 10 for a portable electronic device 110 such as a cell phone. More particularly, the case 10 includes a first portion 11 and a second portion 12 that are coupled to each other in a slidable relationship so that the case portions can slide or be displaced relative to each other along a plane defining the boundary between the first 11 and second 12 portions of the case 10. The coupling of the first portion 11 and second portion 12 may be accomplished by a physical connection, or by electric or magnetic coupling.

The case 10 of the preferred embodiment includes a first portion 11 for covering at least a section of a first portion 111 of a portable electronic device 110, such as a cellular telephone. The case 10 also includes a second portion 12 for covering at least a section of a second portion 112 of a portable electronic device 110. The first portion 111 and second portion 112 of the portable electronic device 110 are slidably connected or coupled to each other so that the first portion 111 can be selectively displaced from the second portion 112. When so displaced, as shown in FIGS. 3B and 4B, a user interface, such as a keyboard 115, is selectively revealed to the user of the portable electronic device 110. In the preferred embodiment, the displacement occurs by the first portion 111 sliding in one dimension along the second portion 112. Thus, the portable electronic device has a first exterior configuration and when slid to reveal the keyboard 115, has a second exterior configuration.

The first portion 11 of the case 10 includes a well 113 or depression to accept a first portion 111 of the portable electronic device 110. The first portion 11 includes side edges 15*a* and 15*b* The second portion 12 includes a well 114 or depression to accept a second portion 112 of the portable electronic device 110. The second portion 12 of the case 10 includes side edges 16*a* and 16*b*. The first 11 and second portions 12 are arranged so that the respective wells 113 and 114 cooperate to encase, hold, cover, secure or envelope the portable electronic device 110. In such a position the wells face each other with the portable device 110 positioned there between. FIG. 2 shows the portable electronic device 110 being inserted into the second portion well 114 so that the portable electronic device 110 is in the case 10, as shown in FIG. 3A-4B. On skilled in the art will recognize that the first portion 111 of portable electronic device 110 will be in the first portion well 113 and the second portion 112 will be in the second portion well 114 when the phone is in the case 10.

One skilled in the art will recognize that such encasing, holding, covering, securing, or enveloping does not require that the device be completely covered by the case 10. This is particularly true when the first portion 11 is displaced from the second portion 12 of the case 10, so that the user interface or keyboard 115 of the portable device 110 is exposed. In such a displaced arrangement as shown in FIGS. 3B and 4A, the wells of the first 11 and second 12 portions of the case 10 are not fully coextensive with each other so that the user interface such as keyboard 115 is exposed.

As shown in the figures that the case portions may include cutouts 117 to allow for a user to access ports on the portable electronic device 110. The first portion 11 of the case 10 may include a large cutout 118 to allow the user to view information or other indicia on a display 150, and even with such a large cutout, is still considered to cover the first portion 111 of the portable electronic device 110.

When the first portion 11 and second portion 21 are in a configuration to cover, encase, hold, or envelop the device, the side edges 15*a* and 15*b* are in an opposed relationship with side edges 16*a* and 16*b*. However, such relationship does not necessitate the side edges being coextensive with one another. Indeed, when the first portion 11 and the second portion 12 of the case 10 are displaced, as shown in FIGS. 1, 3B and 4B, the side edges will not be coextensive with each other.

In such an opposed relationship, structures on the side edges can interact to connect the first portion 11 and the second portion 12 in a movable and preferably slidable relationship. In the preferred embodiment, the interfacing structure are rails and channels that interact with each other to allow the rail to slide in the channel, but to be captured or otherwise restrained in other directions. In other embodiments, the interfacing structure may be magnetic strips.

In the preferred embodiment, the rails and channels are made from extruded plastic. It is preferable that the plastic be stiff to add stiffness to the edges 15*a*, 15*b*, 16*a*, and 16*b* of the case 10. Such stiffness adds support to the parts of the first 11 and second 12 portions that are not opposing each other when the case 10 is slid apart. Without added stiffness, the first 11 and second 12 portions may dislodge from the portable electronic device 110.

In the preferred embodiment, the side edges 15*a* and 15*b* of the first portion 11 of the case 10 include rails 20*a* and 20*b*. The side edges 16*a* and 16*b* of the second portion 12 of the case 10 include channels 21*a* and 21*b*. The profiles of the rails and the channels are complementary so that the rail may slide in the channel. One skilled in the art will recognize that the profiles may be selected from a number of alternatives, an important feature being the channel's ability to retain the rail, and allow for a sliding relationship.

In the preferred embodiment, the rail 20*a* or 20*b* includes a base 51, a connecting portion 52, and a bulb portion 53. The channel 21*a* or 21*b* includes receiving portion 61 that is complementary to receive and slidably retain the bulb portion 53 of the rail. The base 51 of the rail is attached to the side edges of the first portion 11 of the case by adhesive 60. Similarly, the channels 21*a* and 21*b* are attached to the side edges 16*a* and 16*b* of the second portion 12 of the case 10 by adhesive 61. One skilled in the art will recognize that the rails 20*a* and 20*b* and channels 21*a* and 21*b* can be attached in other ways, such as comoulding the case 10 around the channels and rails. In such a construction, it is preferable to have additional structure on the channels and rails to permit improved mechanical fastening, as shown in FIGS. 9-11.

As shown in FIG. 5, the channels 21*a* and 21*b* fit into recesses 22*a* and 22*b* in the second portion 12. One skilled in the art will recognize that the rails 20*a* and 20*b* can be placed in similar recesses in the first portion 11.

In order to improve retention of the case on the portable electronic device 110 such as a cellular phone, it is preferable that the rails 20*a* and 20*b* and channels 21*a* and 21*b* extend along most of length of the side edges. In the preferred embodiment, the second portion 12 of the case includes openings 18*a* and 18*b* to allow the rails 20*a* and 20*b* to slide beyond the bounds of the second portion 12, as shown in FIG. 4B.

In the configuration shown in the figures, the first portion 11 of the case 10 can only slide beyond the bounds of the second portion 12 in the direction shown since the second portion only includes openings 18*a* and 18*b* on the top side of the case 10 and uses rails and channels that are coextensive. The first portion 11 cannot slide off the bottom of the second portion 12 because the rails 21*a* and 21*b* are in the recesses 22*a* and 22*b*, thus blocking one end of the channels. The openings 18*a* and 18*b* would not be needed if the rails 20*a* and 20*b* were shorter than the channels 21*a* and 21*b*, and positioned so that the rails would not extend beyond the bounds of the second portion 12 when the case 10 is slid open.

As show in FIG. 9, the rail 220 of an alternate embodiment includes an area having holes 280 to allow for additional anchoring, particularly when the case is made by a comoulding process. In FIG. 9, the holes 280 are in a flange 270 extending from the base 251 in a direction away for the connecting portion 252 that connects the bulb 253 to the base 251. One skilled in the art will recognize that holes could also be located in the connecting portion 252.

FIG. 9 also shows a channel 221 having an additional structure such as a flange 271 including holes 281. In an alternate embodiment, the holes 281 could be in the channel body 282 itself, and the flange 271 would not be needed. To prevent interference with the sliding of the rail 220, the holes 281 in the channel body 282 would not be through holes, but would only be depressions in the exterior face 283 of the channel body 282.

As shown in FIG. 10, the rail 352 can include a flange 355 parallel to the base 351 to improve mechanical fastening of the rail 352. The connecting portion 356 can include a scalloped shape to prevent the rail 352 from sliding with respect to the section of the case to which it is anchored as the case is operated from an open to a closed position. The corresponding channel 321 can have similar structure.

FIG. 11 shows alternate profiles of a rail and channel. In the alternate embodiment, the base 451 has an increased vertical thickness 460 such that the base 451 is similar in size to the profile of the corresponding channel 421. The vertical faces of the base 483 include depressions 471 to improve mechanical fastening. Similarly, the vertical faces 484 of the channel 421 can also include depressions 473 to improve mechanical fastening.

One skilled in the art will recognize that the embodiments described herein are only examples and do not limit the scope of the invention claimed.

The invention claimed is:

1. A case for a portable electronic device, the portable electronic device having an external housing of two portions coupled to each other so that the coupling structure allows a first portion of the external housing to slide with respect, to a second portion of the external housing, the case having a first portion adapted to conform to at least a part of the first portion of the external housing of the portable electronic device, and a second portion, adapted to conform to at least a part of the second portion of the external housing of the portable electronic device, the first portion of the case and the second portion of the case coupled together so that the first portion of the case slides with respect to the second portion of the case and the first portion of the case covers the first portion of the portable electronic device and a the second portion of the case covers the second portion of the portable electronic device, while the first portion of the external housing and the second portion of the external housing remain coupled to each other.

2. The case of claim 1, wherein the first and second portions of the case are coupled together by a pair of rails attached to the first portion of the case and a pair of channels attached to the second portion of the case, the rails sliding in the channels.

3. The case of claim 2, wherein the second portion of the case includes openings to allow the rails to slide beyond the boundary of the second portion of the case.

4. The case of claim 1, wherein the case is made of silicone.

5. The case of claim 2, wherein the rails are made of plastic and act to stiffen the first portion of the case.

6. A case for a portable electronic device, the portable electronic device having an external housing including a first portion and a second portion, the first portion of the external housing coupled in a slidable relationship with the second portion of the external housing, the case having a first case portion to hold the first portion of the external housing of the device acid a second case portion to hold the second portion of the external housing of the device, the first and second case portions coupled together in a slidable relationship so as to hold the first and second portions of the portable electronic device portions when the case, portions slide, wherein the case is placed on the external housing and removed from the external housing while the first portion of the external housing and the second portion of the external housing are coupled to one another.

7. The case of claim 6, wherein the first and second case portions are coupled together by complementary structures that allow the case portions to slide with respect to each other while holding the respective portions of the external housing of the portable electronic device, but restrain movement of the case portions in other directions.

8. The case of claim 7 wherein the complementary structures are rails and channels that accept a portion of the rail.

9. The case of claim 8 wherein the rails are made of plastic.

10. The case of claim 7, wherein complementary structures are located on side edges of the case portions.

11. The case of claim 7 wherein at least one of the complementary structures stiffens the first case portion.

12. The case of claim 9 wherein the rails include holes, wherein material used to construct the first portion of the case is formed within the holes.

13. The case of claim 9 wherein the rails include structure to mechanically fasten the rails to the case.

14. A case for holding a device having a first portion that is in a sliding relationship with a second portion of the device, the case including a first case portion having a well for accepting the first portion of the device, the well of the first case portion adapted to conform to an exterior surface of the first portion of the device and a second case portion having a second well for accepting the second portion of the device, the well of the second case portion adapted to conform to an exterior surface of the second portion of the device, the wells opposing each other to hold the device between the first and second case portions, the first and second case portions connected to each other by rails on the first case portion, the rails sliding within and captured by channels on the second case portions, the first and second case portions and device interacting so that first case portion moves with the first portion of the device, and the second case portion moves with the second portion of the device.

15. The case of claim 14, wherein the wells are defined by sides, the sides including edges, the side edges of the well of the first case portion having a surface in opposing relationship to the side edges of the well of the second case portion, the side edges of the first case portion including rails in opposing relationship to channels on the side edges of the second case portion.

16. The case of claim 15, wherein the side edges of the wells include recesses, the recess of the side edges of the first case portion receiving the rails, and the recesses of the side edges of the second case portion receiving the channels.

17. The case of claim 2, wherein the case is made of a material that flexes more than the housing of the electronic device, and the rails are made of plastic and act to stiffen the case.

18. The case of claim 17, wherein the rails extend substantially the length of the case.

* * * * *